United States Patent [19]

Iyengar

[11] 4,373,962

[45] Feb. 15, 1983

[54] SURFACE TREATED ALKALI BLUE PIGMENT

[75] Inventor: Doreswamy R. Iyengar, Holland, Mich.

[73] Assignee: BASF Wyandotte Corporation, Wyandotte, Mich.

[21] Appl. No.: 271,438

[22] Filed: Jun. 8, 1981

[51] Int. Cl.$^3$ .................... C09B 48/00; C09C 3/68
[52] U.S. Cl. ..................... 106/288 Q; 106/308 N
[58] Field of Search .................... 106/288 Q, 308 N

[56] References Cited

U.S. PATENT DOCUMENTS

| | | | |
|---|---|---|---|
| 3,635,745 | 1/1972 | Rentel et al. | 106/288 Q |
| 3,925,094 | 12/1975 | Papenfuss et al. | 106/288 Q |
| 3,951,678 | 4/1976 | Wanser | 106/288 Q |
| 4,032,357 | 6/1977 | Rees et al. | 106/288 Q |
| 4,045,424 | 8/1977 | Tartter | 106/288 Q |
| 4,189,328 | 2/1980 | Flores | 106/288 Q |

*Primary Examiner*—Carl F. Dees
*Attorney, Agent, or Firm*—Bernhard R. Swick; Norbert M. Lisicki

[57] ABSTRACT

A soft textured high strength Alkali Blue pigment is produced by treating an aqueous dispersion of the pigment from a regular, untreated presscake with an aqueous solution of a tertiary amine acetate followed by the addition of ammonium hydroxide. Alternatively, the pigment dispersion is treated with an aqueous emulsion/dispersion of a tertiary amine. The mixture is then filtered and dried.

12 Claims, No Drawings

SURFACE TREATED ALKALI BLUE PIGMENT

BACKGROUND OF THE INVENTION

1. Field of the Invention

The invention relates to a pigment composition and to a process for its manufacture. More particularly the invention relates to an improved Alkali Blue pigment composition characterized by a soft texture and high strength and to a process for its manufacture.

2. Description of the Prior Art

"Alkali Blue" is generally known in the art as, and is used herein to define, an arylpararosaniline sulfonic acid of the general formula

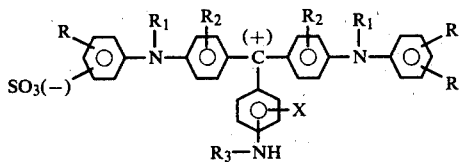

wherein R may be hydrogen, chlorine, bromine, alkyl-containing from 1 to 4 carbon atoms, alkoxy-containing from 1 to 4 carbon atoms, nitro-, amino-, sulfonamide-, alkylamino containing from 1 to 4 carbon atoms; $R_1$ and $R_2$ may be hydrogen, or alkyl containing from 1 to 4 carbon atoms, $R_3$ may be hydrogen or phenyl with or without a grouping such as R and X may be hydrogen, chlorine, bromine, $SO_3H$ or $COOH$.

Due to the strongly polar hydrophilic property of the pigments represented by the above general formula, moist presscakes of these pigments, upon drying, tend to form hard agglomerates and aggregates. Additionally, the extremely fine particle size of the pigment with the resulting hydrogen bonding at the surface makes it extremely difficult to produce ink paste suitable for use in printing by employing the three-roll mill dispersion of the dry pigment into vehicles imparted for that purpose. The difficulties which are associated with the dispersion of thermally dried Alkali Blue press cakes are well known to those skilled in the art and have been disclosed in various publications, e.g., E. K. Fischer, Am. Inkmaker 23 (1945) No. 12 and T. C. Patton, Editor, Pigment Handbook, Vol. 1, page 620.

As a result of the difficulties associated with the dispersion of the dry Alkali Blues for technical use, other methods have been developed suitable for use in, e.g., the printing ink industry. One of these is called the "flush process." In this process the water wet pigment in the press cake is transformed into an oil wet product by kneading in a double arm mixer with the desired vehicle. The water which separates out is drained off and the "flush" is subjected to vacuum treatment or transferred to a roll mill and milled until the remaining residual water has been evaporated. The flush paste is then ready for use directly in ink formulations. The product thus produced usually contains from 35 to 40 percent by weight of the pigment.

In order to prepare large quantities of pigment by the flushing procedure, large size kneading machines working discontinuously are necessary which results in high manufacturing costs. The high vehicle content (60 to 65 percent by weight) in the pigment paste made by the flushing procedure leads to other difficulties associated with compatibility with other ink vehicles for various end uses and in the balancing of properties such as color strength, viscosity, tack, etc. at the required concentration levels in the formulated inks.

As a result, numerous attempts have been made to manufacture more concentrated pigment compositions which can be used in a wide variety of applications. Pigment preparations (containing 10 to 70 percent by weight of natural synthetic acidic resins) which can be dried and converted into readily dispersible pigment powders with high tinctorial strength and grain softness have been reported.

U.S. Pat. No. 4,032,357 teaches the preparation of an Alkali Blue powder and a process for manufacture of same by treatment of an aqueous alkaline solution of a pigment with an organic acid dispersant followed by the addition of a hydrophobic oil phase. U.S. Pat. No. 3,925,094 teaches the preparation of dyestuffs by employing resin acids in order to obtain pigments with good dispersion and high strength. U.S. Pat. No. 3,635,745 teaches the preparation of dyestuffs by treating alkaline solutions of the pigment with an aqueous alkaline solution of resinic acids or the acid modified products thereof. U.S. Pat. No. 4,189,328 teaches the preparation of Alkali Blue pigment compositions by treatment of the Alkali Blue pigments with phenols, cresols and naphthols. None of the prior art teaches the use of amines to produce soft textured high strength Alkali Blue pigment compositions.

DESCRIPTION OF THE PREFERRED EMBODIMENT

A soft textured high strength Alkali Blue pigment is produced as follows: A quantity of Alkali Blue pigment in the form of an untreated presscake, produced by phenylation with aniline of parafuchsin, sulfonation (primarily mono) with sulfuric acid and subsequent precipitation of the caustic solution in mineral acid to obtain pigmentary properties followed by filtration and washing, is dispersed into water. An amine solution in an aqueous acetic acid is added to the dispersion and the mixture is stirred for a period of time. The calculated quantity of aqueous ammonia is added to the mixed slurry. After further stirring, the slurry is filtered and dried to obtain a high-strength, easily-dispersible or soft-textured Alkali Blue pigment.

More specifically, an amount of Alkali Blue pigment in the form of an untreated prescake, produced by phenylation with aniline of parafuchsin, sulfonation (primarily mono) with sulfuric acid and subsequent precipitation of the caustic solution in mineral acid to obtain pigmentary properties followed by filtration and washing, is dispersed into water using suitable means such as a Premier Dispersator at 3000 to 6000 rpm for 10 to 30 minutes to obtain a lump-free smooth slurry containing from 5 to 10 percent by weight pigment. A tertiary amine solution, in 2 to 10 percent by weight aqueous acetic acid, which may contain from 5 to 40 percent tertiary amines based on dry pigment weight, is heated to 50° C. and added to the dispersion of Alkali Blue pigment and stirred with the Dispersator for 15 minutes. A calculated amount of ammonium hydroxide in the form of an aqueous solution containing from 3 to 5 percent by weight ammonium hydroxide is added to the mixed slurry to neutralize the acid. The resulting mixture is stirred for an additional 15 minutes after which the slurry is filtered and dried in a range from 40° C. to 80° C., preferably 50° C. to 60° C.

Alternatively, a known amount of Alkali Blue pigment in the form of a regular, untreated presscake, produced by phenylation with aniline of parafuchsin, sulfonation (primarily mono) with sulfuric acid and subsequent precipitation of the caustic solution in mineral acid to obtain pigmentary properties followed by filtration and washing, is stirred into water using a Premier Dispersator at 3000 to 6000 rpm for 10 to 30 minutes to obtain a lump-free smooth slurry wherein the pigment concentration range is from 5 to 10 percent by weight. An aqueous emulsion/dispersion of a tertiary amine which may contain from 5 to 40 percent, and preferably 8 to 20 percent amine based on the total dry pigment used, is stirred into the pigment slurry and further mixed at ca. 6000 rpm for about 15 minutes. The resulting pigment slurry is filtered and the presscake dried in the range of 40° C. to 80° C., and preferably 50° C. to 60° C. to obtain a high-strength soft textured pigment.

The amines which may be employed in the practice of the invention have the following formula:

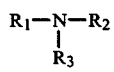

wherein $R_1$, $R_2$ and $R_3$ are alkyl radicals containing from 2 to 22 carbon atoms per alkyl radical or phenyl radicals or benzyl radicals, and may be identical or different. Among those contemplated are triethylamine, tripropylamine, triallylamine, tributylamine, triamylamine, trihexylamine, triheptylamine, tricaprylamine, trioctylamine, diethylaniline, methyldiphenylamine, tribenzylamine, triphenylamine, dimethyloctadecylamine, and mixtures thereof.

The following Examples are intended to exemplify the invention. All parts are by weight unless otherwise designated.

EXAMPLE 1

An Alkali Blue slurry was prepared by stirring 842.5 grams of a regular, untreated Alkali Blue presscake, produced by phenylation with aniline of parafuchsin, sulfonation (primarily mono) with sulfuric acid and subsequent precipitation of the caustic solution in mineral acid to obtain pigmentary properties followed by filtration and washing, containing 200 grams of pigment into 1650 grams of water in a battery jar. A solution of 200 grams of water containing 4 grams of glacial acetic acid and 22.2 grams of dimethyloctadecylamine was added to the slurry slowly under continuous stirring. To this was added 100 grams of an aqueous solution of 4 percent by weight ammonium hydroxide and the mixture was stirred for 15 minutes. The slurry was filtered and the pigment was dried at 50° C. The resulting pigment showed excellent strength and soft texture when compared to a pigment obtained by directly drying a portion of the identical presscake at 50° C. without a pretreatment step.

EXAMPLE 2

An Alkali Blue slurry was prepared by stirring 190 grams of a regular, untreated red shake Alkali Blue presscake, produced by phenylation with aniline of parafuchsin, sulfonation (primarily mono) with sulfuric acid and subsequent precipitation of the caustic solution in mineral acid to obtain pigmentary properties followed by filtration and washing, containing 45 grams of pigment into 300 mls of water in a battery jar. A solution of 10 grams of dimethyloctadecylamine in 100 grams of water containing 2 grams of glacial acetic acid was added to the slurry and stirred for 15 minutes. To this was added 40 grams of a 5 percent aqueous solution of ammonium hydroxide. The resulting slurry was stirred thoroughly, filtered and the product dried at 55° C. The product had good tinting strength and excellent texture.

EXAMPLE 3

The process in example 2 was repeated, except that a solution of NaOH was employed in place of ammonium hydroxide. The product obtained was poor in texture and weak in tinting strength.

EXAMPLE 4

This experiment was again similar to example 2, except that Duomeen-C, made by Armak Company, (N-coco-1,3 diaminopropane; primary amine-43%, secondary amine-43%) was used in place of dimethyloctadecylamine. The product recovered was weak in strength and poor in texture.

EXAMPLES 5-14

A slurry of Alkali Blue pigment was prepared by stirring 379.1 grams of a washed red shade Alkali Blue in the form of a regular, untreated presscake, produced by phenylation with aniline of parafuchsin, sulfonation (primarily mono) with sulfuric acid and subsequent precipitation of the caustic solution in mineral acid to obtain pigmentary properties followed by filtration and washing, containing 90 grams of the pigment into 500 grams of water. Ten grams of amine either as an emulsion or dispersion in water was added and the mixture stirred for 15 minutes. The slurry of pigment was filtered, washed with water and dried at 55° C. The resulting dry pigment was ground and tested versus a standard prior art resinated toner. The results obtained are listed in Table I below. The test procedure consists of mixing 0.1 gram of the powdered pigment with 5 grams of a white bleach (40% ZnO, 38.5% Lawter's Thermex A6E Binder, made by Lawter Chemicals, Inc., and 21.5% Magie 470 oil, Magie Brothers Oil Company, and determining the development of tint as a function of the number of passes using a Hoover Muller.

TABLE I

| Example | Amine Used | Type | Nature of Pigment Formed |
|---|---|---|---|
| 5 | N—Butylamine | Primary | Color degraded; hard texture very poor vs. standard |
| 6 | Tri-Butylamine | Tertiary | Good color; excellent texture comparable to standard |
| 7 | Tri-Caprylyl-amine | Tertiary | Good Color and excellent texture; comparable to standard |
| 8 | Tetra-ethylene Pentamine | Primary | Poor color; gritty and hard difficult to disperse |
| 9 | Triethylene tetramine | Primary | Poor color; gritty and hard difficult to disperse |
| 10 | Duomeen-C (N—coco diamino propane) | Primary | Degraded color; poor texture very poor vs. standard |
| 11 | Armeen-C (coco amine) | Primary | Degraded color; poor texture very poor vs. standard |
| 12 | Aniline | Aromatic Primary | Degraded color; hard texture very poor vs. standard |
| 13 | Octyl amine | Primary | Poor color; poor texture |
| 14 | Dimethyl Octadecyl amine | Tertiary | Good color; soft texture excellent vs. standard |

The embodiments of the invention in which an exclusive privilege or property is claimed are defined as follows:

1. A process for preparing a soft textured high strength Alkali Blue pigment composition consisting of tertiary amines and untreated Alkali Blue wherein the Alkali Blue pigment in the form of a regular, untreated presscake, produced by phenylation with aniline of parafuchsin, sulfonation, primarily mono, with sulfuric acid and subsequent precipitation of the caustic solution in mineral acid to obtain pigmentary properties followed by filtration and washing, is dispersed in water which comprises mixing said dispersion with (a) an aqueous solution of a tertiary amine acetate and (b) sufficient ammonium hydroxide to precipitate said amine onto the pigment, and recovering said pigment composition.

2. The process of claim 1 wherein said tertiary amine contains from 6 to 22 carbon atoms.

3. The process of claim 1 wherein the concentration of amine is from 5 to 40 percent based on the weight of the pigment.

4. A soft textured high strength Alkali Blue composition prepared by dispersing Alkali Blue pigment in the form of a regular, untreated presscake, produced by phenylation with aniline of parafuchsin, sulfonation, primarily mono, with sulfuric acid and subsequent precipitation of the caustic solution in mineral acid to obtain pigmentary properties followed by filtration and washing, in water, mixing said dispersion with an aqueous solution of a tertiary amine acetate, precipitating said amine onto said pigment by adding ammonium hydroxide and recovering said pigment composition.

5. The product of claim 4 wherein said tertiary amine contains from 6 to 22 carbon atoms.

6. The product of claim 4 wherein the concentration of said tertiary amine is from 5 to 40 weight percent based on the weight of the pigment.

7. A process for preparing a soft textured high strength Alkali Blue pigment composition consisting of insoluble tertiary amines and Alkali Blue pigment wherein the Alkali Blue pigment in the form of a regular, untreated presscake, produced by phenylation with aniline of parafuchsin, sulfonation, primarily mono, with sulfuric acid and subsequent precipitation of the caustic solution in mineral acid to obtain pigmentary properties followed by filtration and washing, is dispersed in water which comprises mixing said dispersion with (a) an aqueous emulsion/dispersion of tertiary amine and (b) recovering said pigment composition.

8. The process of claim 7 wherein said tertiary amine contains from 6 to 22 carbon atoms.

9. The process of claim 7 wherein the concentration of said tertiary amine is from 5 to 40 percent based on the weight of the pigment.

10. A soft textured high strength Alkali Blue pigment composition prepared by dispersing said pigment, in the form of a regular, untreated presscake, produced by phenylation with aniline of parafuchsin, sulfonation, primarily mono, with sulfuric acid and subsequent precipitation of the caustic solution in mineral acid to obtain pigmentary properties followed by filtration and washing in water, mixing said dispersion with an aqueous emulsion/dispersion of a tertiary amine and recovering said pigment composition.

11. The product of claim 10 wherein said tertiary amine contains from 6 to 22 carbon atoms.

12. The product of claim 10 wherein the concentration of said amine is from 5 to 40 weight percent based on the weight of the pigment.

* * * * *